United States Patent [19]

Linford

[11] 4,219,703
[45] Aug. 26, 1980

[54] SOUND REPRODUCTION DEVICE FOR TALKING BOOKS

[75] Inventor: James Linford, Livingston Manor, N.Y.

[73] Assignee: I-Production Establishment, Vaduz, Liechtenstein

[21] Appl. No.: 814,859

[22] Filed: Jul. 12, 1977

[51] Int. Cl.² .............................................. G11B 7/16
[52] U.S. Cl. .................... 179/100.3 R; 179/100.41 L; 179/100.3 B; 179/100.3 K; 35/8 A; 250/227
[58] Field of Search .................. 179/100.3 T, 100.3 Z, 179/100.41 L, 100.3 B, 100.3 R, 100.3 L, 100.3 E, 100.3 K, 100.1 C; 35/35 C, 8 A; 250/227, 226; 360/117

[56] References Cited

U.S. PATENT DOCUMENTS

| | | | |
|---|---|---|---|
| 2,018,200 | 10/1935 | Crudo | 179/100.3 R |
| 2,369,572 | 2/1945 | Kallmann | 35/35 |
| 2,851,539 | 9/1958 | Brown | 179/100.1 C |
| 3,007,259 | 11/1961 | Abma | 35/35 |
| 3,235,672 | 2/1966 | Beguin | 179/100.3 T |
| 3,281,151 | 10/1966 | Kaprelian | 179/100.3 B |
| 3,474,194 | 10/1969 | Lees | 179/100.3 B |
| 3,676,690 | 7/1972 | McMillin | 235/61.11 E |
| 3,676,938 | 7/1972 | Trehub | 35/35 A |
| 3,767,208 | 10/1973 | Chernowitz | 360/117 |
| 3,770,909 | 11/1973 | Rose | 179/100.3 B |
| 3,970,803 | 7/1976 | Kinzie | 179/100.3 B |
| 3,992,593 | 11/1976 | Heine | 179/100.41 L |
| 4,044,207 | 8/1977 | Vlahos | 179/100.3 E |

OTHER PUBLICATIONS

Scan System Using a Semiconductor Light Source and Light Detector, by Spitzak, Journal of SMPTE, vol. 75, Feb., 1966, pp. 103–105.

*Primary Examiner*—Stuart N. Hecker
*Assistant Examiner*—Alan Faber
*Attorney, Agent, or Firm*—Pennie & Edmonds

[57] ABSTRACT

A sound reproducing device is disclosed for reproducing sound recorded on an optical sound track, having a manually movable wheeled vehicle with means provided for regulating its speed along such track, a light source substantially restricted to red and infrared light mounted on the vehicle for directing light onto such track, a plurality of light conduit means for transmitting light, the conduit means having input ends mounted on the vehicle and arranged in a substantially linear array transverse to the track for permitting manual movement of the source and the input ends along the optical sound track so as to receive light from the source incident upon a strip of the sound track. The conduit means have output ends arranged in a compact array and a maximum linear dimension substantially less than the length of the linear array. The device further includes photosensor means positioned to receive light from the output ends of the light conduit means and capable of providing an electrical signal substantially proportional to the intensity of the light thus received, amplifier means to receive the electrical signal from the photosensor means and for amplifying the signal, and loudspeaker means to receive the amplified electrical signal from the amplifier means for producing output sound responsive to the signal as the vehicle is moved along the optical sound track. The arrangement facilitates the reproduction of sound from a sound track having a width greater than the maximum widthwise dimension of the photosensor means thereby facilitating alignment of the light conduit means with the sound track and providing a relatively substantial signal to noise ratio.

12 Claims, 4 Drawing Figures

SOUND REPRODUCTION DEVICE FOR TALKING BOOKS

BACKGROUND OF THE INVENTION

1. Field of the Invention

This invention relates to an improved sound reproduction device particularly useful for talking books and the like. More specifically, it relates to a sound reproduction device which can be used for reproducing sound recorded on an optical sound track printed on an opaque surface. The device is particularly useful in conjunction with "talking books" such as children's books, dictionaries, and language texts, which are adapted to include printed optical sound tracks for illustrative sound effects or as pronunciation guides.

2. History of the Art

Optical sound recording and reproduction is one of the most promising approaches to the development of commercially viable "talking books" capable of supplementing written text with recognizable sound. The advantage of this approach is that the text and the optical record and be printed simultaneously using conventional printing techniques. Magnetic recording, in contrast, requires the use of magnetic materials, separate application and recording, and, in some instances, the use of magnetic shielding materials to prevent crosscoupling between adjacent tracks.

While optical sound recording has been known for many years, presently available optical reproduction heads are not well suited for manual operation. Optical sound systems using stationary reproduction devices have been used for many years in the motion picture industry. Such systems typically involve modulation of a light beam transmitted through a moving optical track. Specifically, the sound track is photographically recorded on the film as an optical track comprising a narrow strip of variable optical density or variable transparent area. During projection, the film is passed between a light source and a photocell so that the optical track modulates the intensity of the light reaching the photocell, and the thus-modulated output of the photocell is amplified and applied to a speaker where it is converted into sound.

U.S. Pat. No. 2,369,572 issued to H. E. Kallman proposes the use of printed optical tracks in talking books. It does not, however, describe the sound reproduction device to be used with these books.

U.S. Pat. No. 2,018,200 issued to Fernando Crudo describes a sound reproduction device to be used in playing sound records of the type disclosed therein. In this arrangement, the sound is reproduced by reflecting light from the track directly into a photocell connected to a speaker. Such an arrangement is not, however, well suited to manual operation as is desired for talking books.

For good results using manual operation, it is desirable to demodulate the light reflected from strips of the optical track which are relatively narrow in the direction of pick up device translation and relatively long in the transverse direction. The strips are desirably narrow in order to achieve good frequency response and desirably long in order to permit the use of a relatively wide optical track which can be manually followed.

SUMMARY OF THE INVENTION

In accordance with the invention, an optical sound reproduction device is provided with a plurality of light conduits, such as fiber optics, with one set of ends arranged in a substantially linear array for receiving light from a narrow transverse strip of an optical track and with the other set of ends arranged in a compact array having a maximum linear dimension substantially less than the length of said linear array for permitting exit of the light onto a photosensor. The advantages of this structure are: (1) it provides a compact and highly efficient arrangement for selectively taking light from a sufficiently narrow strip of track to obtain good frequency response; (2) it permits the use of relatively wide optical sound tracks, such as composite tracks; and (3) it minimizes alignment problems for manually controlled sound reproduction.

BRIEF DESCRIPTION OF THE DRAWINGS

The nature, advantages, and various additional features of the invention will appear more fully upon consideration of the illustrative embodiments now to be described in detail in connection with the accompanying drawings.

In the drawings.

For convenience of reference, similar elements are designated by the same reference numeral throughout the drawing.

DETAILED DESCRIPTION OF THE DRAWINGS

Figure 1:
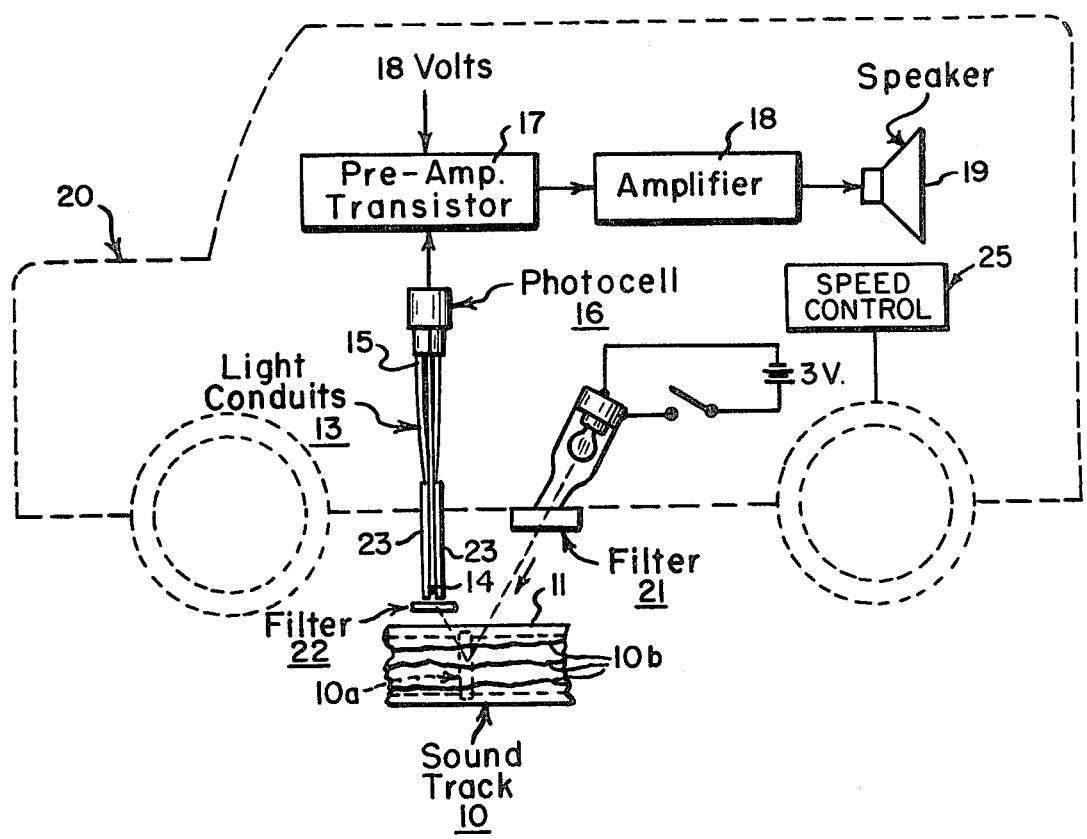
FIG. 1 is a schematic block diagram illustrating an exemplary sound reproduction device in accordance with the invention.

Referring to the drawings, FIG. 1 is a block diagram schematically illustrating a device in accordance with the invention for reproducing sound recorded on an optical sound track 10 which can be printed on an opaque printing medium 11 such as a sheet of paper. In essence, the sound reproduction device comprises a light source 12 for shining light onto track 10 and medium 11, a plurality of light conduits 13 with input ends 14 arranged in a substantially linear array for receiving light incident upon an optical track 10 from a narrow, substantially transverse strip 10a and output ends 15 arranged in a compact array, such as a substantially circular array, for permitting the exit of the received light onto a correspondingly compact region of photosensor 16. As better illustrated in FIG. 2A, the maximum linear dimension in the compact array (e.g., its diameter) will be substantially smaller than the length of the linear array.

In order to permit the use of optical tracks of sufficient width that manual alignment can be used, it is contemplated that track 10 can be composite track comprising a plurality of spaced apart, substantially linear tracks 10b having sound modulated widths. The composite track can comprise a plurality of substantially identically modulated tracks or a plurality of spaced apart constituent linear components of a single modulated sound track.

In arrangement for manual device operation, the track advantageously has a relatively wide transverse dimension. If the track were narrow, a relatively short array would be required in order to avoid an unduly low signal to noise ratio, and a manual operator would have the problem of aligning a narrow array along a narrow track. Thus relatively wide composite tracks, having widths in excess of about 0.25 inch are preferred. In addition, in applications where the track may be disposed adjacent other printed material, e.g. half-tone illustrations, the linear array should have a length somewhat less than the total transverse width reserved for sound track so that minor errors in transverse alignment do not "pick up" portions of the illustration as noise. Advantageously, the linear array is less than about 80% of the track width. Preferably the track has a width of about 0.5 inch and the array has a length of about 75% of this dimension. A composite sound track can be conveniently made using a conventional optical sound track machine of the type used for 16 millimeter film. A photographic single track is first made and reproduced several times. A master composite track is then made by aligning the copies in the direction to be read and spacing them apart. Conventional techniques are then used to convert the photographic master into printing masters. It should be noted that conventional 16 millimeter sound speed (about one second of sound for a 10 inch strip) is a convenient speed for manually operated reproducing devices. Greater sound density can be recorded by the use of conventional voice compressors.

Figure 3:
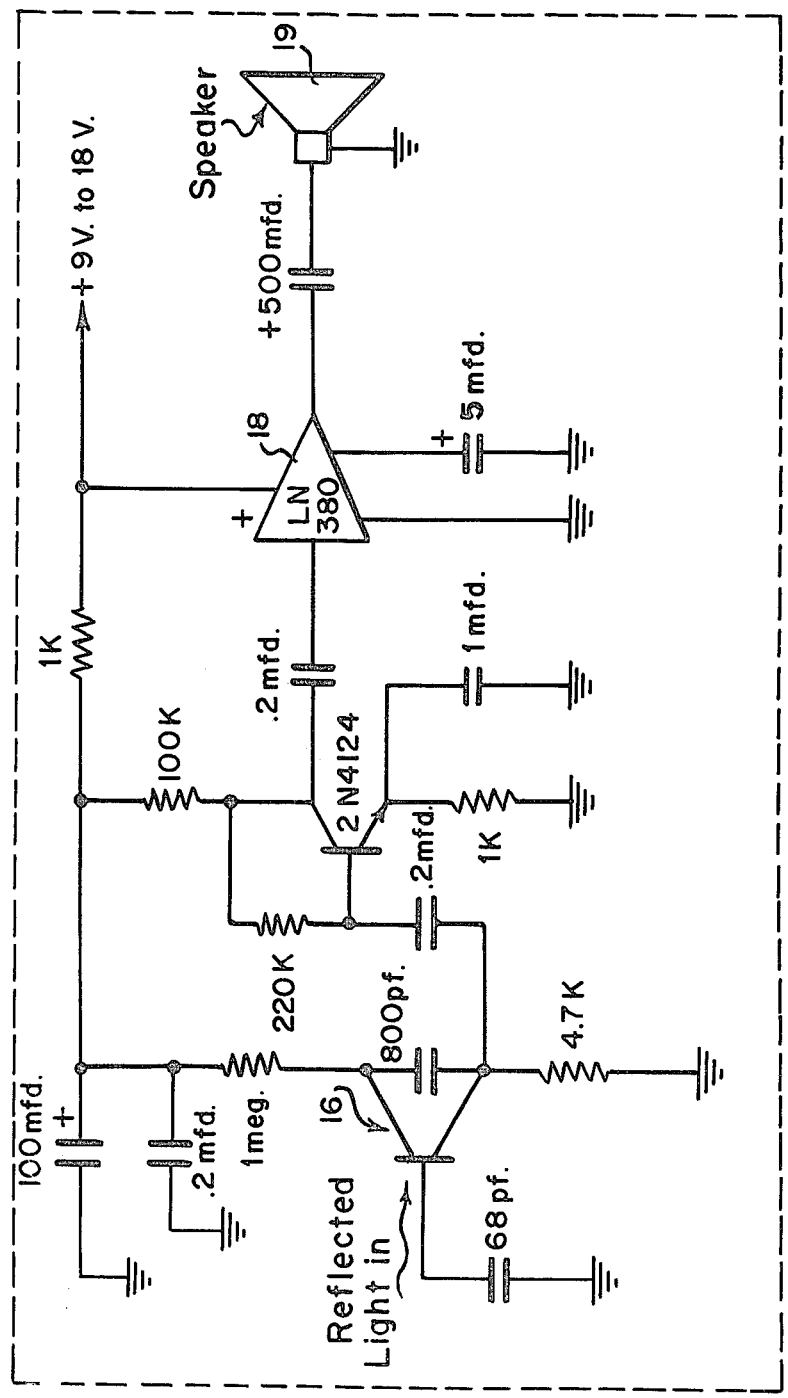
FIG. 3 is a circuit diagram of a preferred amplifying circuit useful in the embodiment of FIG. 1.

The electrical output of photosensor 16 is advantageously pre-amplified in a transistor pre-amplification circuit 17 such as shown in FIG. 3 and the pre-amplified output is applied to a power amplifying circuit 18 such as the integrated chip power amplifier marketed by RCA under the designation LN380. The thus-amplified signal, in turn, is applied to a speaker 19, such as an eight ohm speaker, for conversion into sound.

In a preferred form of this device, it is contemplated that the principle components, including light source 12 and the input ends of light conduits 13 will be mounted in a substantially fixed relationship to one another on a movable carrier, schematically designated 20, which can be manually translated along track 10. The carrier can, for example, comprise a wheeled vehicle, such as a toy car or truck, with the array of light conduit input ends 14 mounted so that they are suspended a fraction of an inch above the surface over which the wheels run. As the quality of the signal reproduced is somewhat sensitive to pickup speed, the movable carrier can advantageously be restricted to a limited range of speeds as by gearing, by a flywheel or by a governor coupled to its wheels as shown schematically at 25 in FIG. 1.

Light source 12 is preferably a source of "white" light such as a focused three volt incandescent lamp for focusing a small spot of light on the sound track directly under the input ends of conduits 13. Such a source is small, requires little current, is readily available and highly efficient. Alternatively, light source 12 can be a restricted frequency source of red or infrared light such as a light emitting diode. Such a source has the further advantage of low thermal noise.

If source 12 is a source of white light, red transmission filters 21 and 22 are advantageously disposed in the light paths between the light source 12 and the sound track 10 and between the track and the input ends 14 of light conduits 13. Such filters, it has been found, increase the signal-to-noise ratio of the device. This increase is believed attributable to enhanced absorption of red and infrared light by the dark printed areas of the sound track.

Light conduits 13 are preferably fiber optics such as 20 mil diameter or smaller fiber optics woven together in a flat ribbon. Such fiber optic ribbon is available under the tradename CROFON from E. I. du Pont de Nemours, du Pont Building, Wilmington, Delaware 19898.

Photosensor 16 is preferably an infrared sensitive phototransistor having low dark current and a substantially linear response.

Figure 2A:
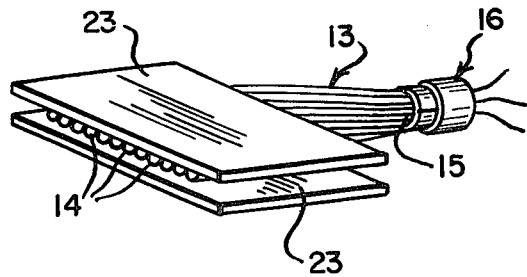
FIGS. 2A and 2B illustrate a preferred subassembly of optical conduit and photosensor useful in the embodiment of FIG. 1.
Figure 2B:
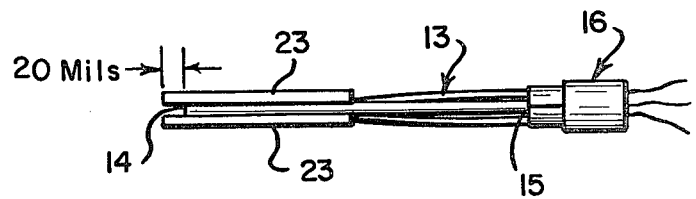

FIGS. 2A and 2B illustrate the sub-assembly of the optical conduits and the photosensor in a preferred form of the device wherein light conduits 13 comprise fiber optic ribbon. The input end of the ribbon is preferably fixed into a linear array by, for example, sandwiching it between two thin sheets of opaque material such as aluminum 23. Advantageously, the input ends are recessed inwardly of the edge of the aluminum sandwich by approximately 20 mils in order to restrict the channel of light impinging upon the ends. Alternatively, a cylindrical lens could be used to accomplish the same result.

The output end of the ribbon is rolled into a cylinder and retained in cylindrical form by a short piece of plastic, such as Heatshrink. This cylindrical end is then attached to the phototransistor above the active element by epoxy.

FIG. 3 shows the circuit diagram of a preferred amplifying circuit 18 for this device. The circuit components are all standard items and preferably have the values of resistance and capacitance set forth in the drawing.

While the invention has been described in connection with only a small number of specific embodiments, it is to be understood that these are merely illustrative of the many other specific embodiments which can also utilize the principles of the invention. Numerous and varied devices can be made by those skilled in the art without departing from the spirit and scope of the present invention.

I claim:

1. A sound reproduction device for reproducing sound recorded on an optical sound track printed on paper comprising:
  (a) a movable wheeled vehicle capable of being manually moved along such optical sound track, said vehicle being provided with means for regulating its speed along such track;
  (b) a light source substantially restricted to red and infrared light mounted on said vehicle for directing light onto such optical sound track;
  (c) a plurality of light conduit means for transmitting light, said conduit means having input ends mounted on said vehicle and arranged in a substantially linear array transverse to such track for permitting manual movement of said source and said input ends along such optical sound track for simultaneously receiving light from said source incident upon a strip of such optical sound track, said conduit means having output ends arranged in a compact array having a maximum linear dimension substantially less than the length of said linear array;
  (d) photosensor means positioned to receive light from said output ends of said light conduit means and capable of providing an output electrical signal substantially proportional to the intensity of light thus received;

(e) amplifier means to receive said electrical signal from said photosensor means and for amplifying said electrical signal; and (f) loudspeaker means to receive said amplified electrical signal from said amplifier means and for producing output sound responsive to said signal as said vehicle is moved along such optical sound track, said arrangement thus facilitating the reproduction of sound from a sound track having a width substantially greater than the maximum widthwise dimension of said photosensor means thereby facilitating alignment of said light conduit means with such sound track and providing a relatively substantial signal to noise ratio.

2. A sound reproduction device according to claim 1 wherein said light conduit means comprise fiber optics.

3. A sound reproduction device according to claim 1 wherein said light conduit means comprise fiber optics having a diameter of about twenty mils or less.

4. A sound reproduction system comprising in combination:
(a) a composite optical sound track printed on paper, comprising a plurality of spaced apart, substantially linear tracks having sound modulated widths; and
(b) a sound reproduction device comprising:
(1) a movable wheeled vehicle capable of being manually moved along said optical sound track, said vehicle being provided with means for regulating its speed along said track;
(2) a light source substantially restricted to red and infrared light mounted on said vehicle for directing light onto said optical sound track;
(3) a plurality of light conduit means for transmitting light, said conduit means having input ends mounted on said vehicle and arranged in a substantially linear array transverse to said track for permitting manual movement of said source and said input ends along said optical sound track for simultaneously receiving light from said source incident upon a strip of said optical sound track, said conduit means having output ends arranged in a compact array having a maximum linear dimension substantially less than the length of said linear array;
(4) photosensor means positioned to receive light from said output ends of said light conduit means and capable of providing an output electrical signal substantially proportional to the intensity of light thus received;
(5) amplifier means to receive said electrical signal from said photosensor means and for amplifying said electrical output signal; and
(6) loudspeaker means to receive said amplified electrical signal from said amplifier means and for producing output sound responsive to said signal as said vehicle is moved along said optical sound track, said arrangement thus facilitating the reproduction of sound from a sound track having a width substantially greater than the maximum widthwise dimension of said photosensor means thereby facilitating alignment of said light conduit means with said sound track and providing a relatively substantial signal to noise ratio.

5. A sound reproduction system according to claim 4 wherein said composite optical sound track is comprised of a plurality of substantially identically modulated tracks.

6. A sound reproduction system according to claim 4 wherein said composite optical sound track comprises a plurality of spaced apart constituent linear components of a single modulated sound track.

7. A sound reproduction system according to claim 4 wherein said composite optical sound track is disposed on an opaque paper.

8. A sound reproduction system according to claim 4 wherein said light conduit means comprise fiber optics.

9. A sound reproduction system according to claim 4 wherein said composite optical sound track has a width in excess of about 0.25 inch.

10. A sound reproduction system according to claim 4 wherein the linear array of light conduit input ends has a length of less than about 80% the width of said composite sound track.

11. A sound reproduction device for reproducing sound recorded on an optical sound track printed on paper comprising:
(a) a movable wheeled vehicle capable of being manually moved along such optical sound track, said vehicle being provided with means for regulating its speed along such track;
(b) a source of white light mounted on said vehicle for directing light onto such optical sound track said source being provided with red transmission filter means for substantially eliminating light other than red light and infrared light;
(c) a plurality of light conduit means for transmitting light, said conduit means having input ends mounted on said vehicle and arranged in a substantially linear array transverse to said track for permitting manual movement of said source and said input ends along such optical sound track for simultaneously receiving light from said source incident upon a strip of such optical sound track, said conduit means having output ends arranged in a compact array having a maximum linear dimension substantially less than the length of said linear array;
(d) photosensor means positioned to receive light from said output ends of said light conduit means and capable of providing an output electrical signal substantially proportional to the intensity of light thus received;
(e) amplifier means to receive said electrical signal from said photosensor means and for amplifying said electrical output signal; and
(f) loudspeaker means to receive said amplified electrical signal from said amplifier means and for producing output sound responsive to said signal as said vehicle is moved along such optical sound track, said arrangement thus facilitating the reproduction of sound from a sound track having a width substantially greater than the maximum widthwise dimension of said photosensor means thereby facilitating alignment of said light conduit means with said sound track and providing a relatively substantial signal to noise ratio.

12. A sound reproduction device for reproducing sound recorded on an optical sound track printed on paper comprising:
(a) a movable wheeled vehicle capable of being manually moved along such optical sound track, said vehicle being provided with means for regulating its speed along such track;
(b) a light source mounted on said vehicle for directing light onto such optical sound track;

(c) a plurality of light conduit means for transmitting light, said conduit means having input ends mounted on said vehicle and arranged in a substantially linear array transverse to said track for permitting manual movement of said light source and said input ends along such optical sound track for simultaneously receiving light from said source incident upon a strip of such optical sound track, said conduit means having output ends arranged in a compact array having a maximum linear dimension substantially less than the length of said linear array;

(d) red transmission filter means disposed in the light path between such optical sound track and the array of light conduit input ends for substantially eliminating light other than red light and infrared light;

(e) photosensor means positioned to receive light from said output ends of said light conduit means and capable of providing an output electrical signal substantially proportional to the intensity of light thus received;

(f) amplifier means to receive said electrical signal from said photosensor means and for amplifying said electrical output signal; and (g) loudspeaker means to receive said amplified electrical signal from said amplifier means and for producing output sound responsive to said signal as said vehicle is moved along such optical sound track, said arrangement thus facilitating the reproduction of sound from a sound track having a width substantially greater than the maximum widthwise dimension of said photosensor means thereby facilitating alignment of said light conduit means with such sound track and providing a relatively substantial signal to noise ratio.

* * * * *